(12) United States Patent
Landrum

(10) Patent No.: US 6,428,246 B1
(45) Date of Patent: Aug. 6, 2002

(54) SYSTEM AND METHOD OF CONVEYING, STORING, AND DISPENSING PACKING MATERIAL

(75) Inventor: Grady F. Landrum, Basking Ridge, NJ (US)

(73) Assignee: Sealed Air Corporation, Duncan, SC (US)

( * ) Notice: Subject to any disclaimer, the term of this patent is extended or adjusted under 35 U.S.C. 154(b) by 15 days.

(21) Appl. No.: 09/598,895

(22) Filed: Jun. 22, 2000

(51) Int. Cl.[7] ............................................. B65G 53/00
(52) U.S. Cl. ..................... 406/197; 406/94; 406/153; 406/155; 226/97.3; 226/118.5; 493/967
(58) Field of Search ......................... 406/94, 153, 155, 406/197, 97.2, 97.3; 226/118.5, 966; 493/967

(56) References Cited

U.S. PATENT DOCUMENTS

| | | |
|---|---|---|
| 1,597,438 A | 8/1926 | Ennis |
| 1,941,429 A | 12/1933 | Berger |
| 3,157,440 A | 11/1964 | Hijiya et al. |
| 3,224,812 A | 12/1965 | Bozich |
| 3,389,534 A | 6/1968 | Pendleton |
| 3,494,331 A | 2/1970 | Eckert |
| 3,575,757 A | 4/1971 | Smith |
| 3,628,720 A | 12/1971 | Schmedding |
| 3,667,593 A | 6/1972 | Pendleton |
| 3,708,208 A | 1/1973 | Fuss |
| 3,762,772 A | 10/1973 | Fuss |
| 3,817,803 A | 6/1974 | Horsky |
| 3,825,198 A | 7/1974 | Oehninger |
| 3,870,374 A * | 3/1975 | Wentzel et al. ................ 406/28 |
| 4,116,491 A | 9/1978 | Ply |
| 4,128,198 A | 12/1978 | Woodley |
| 4,167,235 A | 9/1979 | Green |
| 4,284,372 A | 8/1981 | Smith |
| 4,422,565 A * | 12/1983 | Reba ............................. 226/97 |
| 4,764,058 A * | 8/1988 | Jones et al. .................. 406/117 |
| 5,000,623 A | 3/1991 | Kihlstrom |
| 5,040,929 A | 8/1991 | Paul et al. |
| 5,118,226 A | 6/1992 | Horii et al. |
| 5,216,868 A | 6/1993 | Cooper et al. |
| 5,323,819 A | 6/1994 | Shade |
| 5,326,194 A | 7/1994 | Pinto et al. |
| 5,693,163 A | 12/1997 | Hoover et al. |
| 5,699,645 A | 12/1997 | Vaccarello |
| 5,937,614 A | 8/1999 | Watkins et al. |
| RE36,501 E | 1/2000 | Hoover et al. |
| 6,041,936 A | 3/2000 | Weder |
| 6,168,560 B1 * | 1/2001 | Pluymaekers et al. ........ 493/359 |

FOREIGN PATENT DOCUMENTS

EP    1 013 573 A1    6/2000

* cited by examiner

Primary Examiner—Christopher P. Ellis
Assistant Examiner—Joe Dillon, Jr.
(74) Attorney, Agent, or Firm—Banner & Witcoff, Ltd.

(57) ABSTRACT

A system and method for conveying and dispensing packing material, such as a chain of linked air bags which includes a pressurized pathway and an elongated hopper that conveys and dispenses the air bags. The hopper includes a plurality of air jets that transfer the bags between each jet to a remote end of the hopper, and a series of dispensing ports so the bags may be accessed by several users. The hopper further includes a venting and display surfaces throughout its length.

22 Claims, 4 Drawing Sheets

SYSTEM AND METHOD OF CONVEYING, STORING, AND DISPENSING PACKING MATERIAL

FIELD OF THE INVENTION

This invention relates to a system and method for conveying, storing, and dispensing packing materials to a packing station for easy access and use by a worker, and in particular, to a system and method for enhancing the use of linked air bag type packaging.

BACKGROUND OF THE INVENTION

Numerous finished goods and articles are packaged by business operations such as retail mail order, catalog, Internet electronic commerce, and wholesale merchants. Packing material is utilized to protect the goods from damage during shipping and receiving operations.

Various systems have been developed for transporting loose packing material. Such systems, for example as disclosed in U.S. Pat. Nos. 4,167,235 to Green, U.S. Pat. No. 4,284,372 to Smith, and U.S. Pat. No. 3,708,208 and U.S. Pat. No. 3,762,772 to Fuss, use ducts and fans to blow the granular packing material to a vertically dispensing hopper or tube. The loose, granular type materials, however, are difficult to handle and require substantial storage space.

Due to these difficulties, many operations use air bags linked together seriatim in a chain for packing containers. In a typical operation, the goods are distributed by a conveyor to a plurality of work stations where workers manually place the packing material into the shipping containers about the goods. Large, portable bins are used to transport the linked air bags from a forming machine where they are produced to the work stations. The workers can then grab the air bags needed from the bin and separate them from the chain for use in packing. Although the packing material is readily made and is easy to handle, additional workers are needed to cart the bins between the forming machine and the work stations. As a result, this type of material distribution system tends to be labor intensive, inefficient, and expensive.

Alternatively, a forming machine has been located at each work station so that the air bags are discharged directly into the bins. While this set up reduces the number of workers needed for the operation, costs are still high due to the need for many more forming machines. Moreover, the operation and maintenance of additional forming machines also adds to the cost of the operation.

SUMMARY OF THE INVENTION

The present invention is directed to a system and method for conveying, storing, and dispensing chain type air bags.

One aspect of the present invention includes a method and system for easing and improving the handling of a plurality of air bags formed in a continuous chain. The system includes an air pressurization device which provides a stream of air to transport the chain of linked air bags through a pathway from a source, such as a forming machine, to a hopper. A horizontal hopper receives the air bags from the pathway through an opening at one end. The hopper includes a plurality of dispensing ports to provide manual access to the bags by the workers.

In another aspect of the invention, auxiliary drives are provided at spaced intervals along the length of the hopper receiving the packing material. The auxiliary drives produce jets of air to convey the air bags throughout the length of the hopper so that many work stations can be served by a single hopper. The hopper further has venting surfaces that exhaust a volume of air from the hopper.

In another aspect of the invention, the hopper includes a transparent display surface for viewing the packaging material located inside the hopper. The ability to see the air bags within the hopper helps the workers efficiently operate the system. The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

Figure 1:
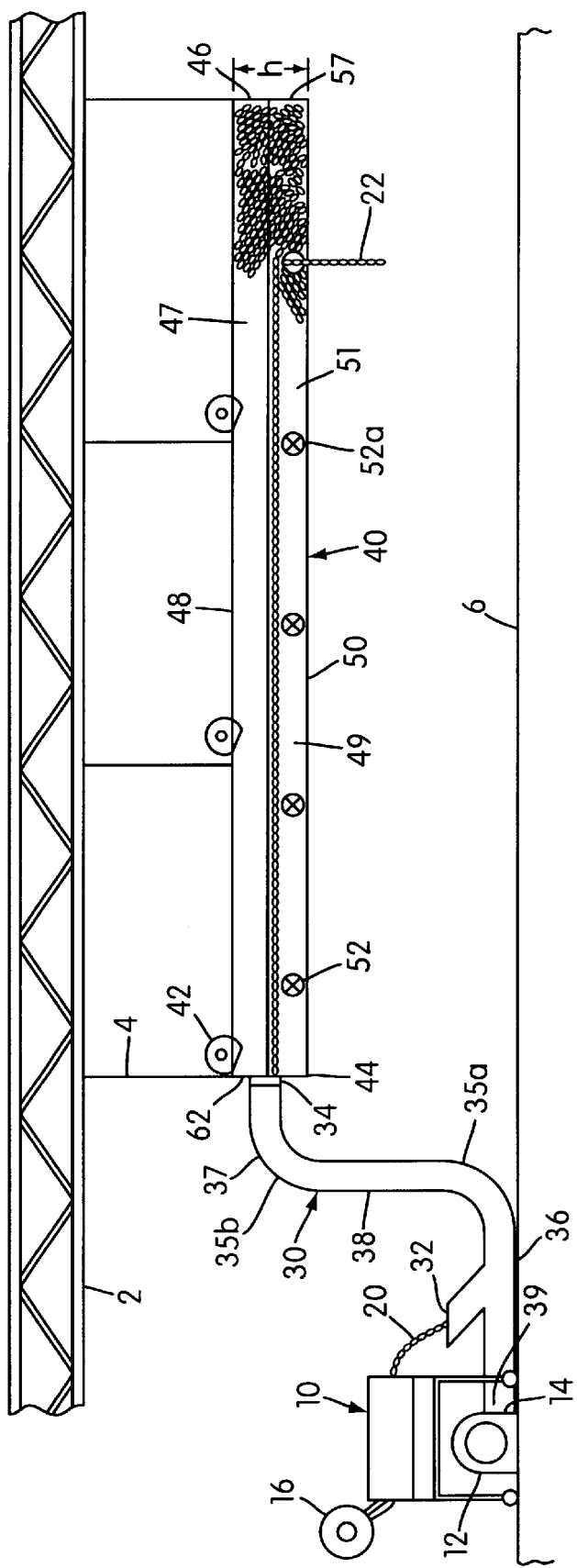
FIG. 1 is a side elevational view of a system in accordance with the present invention showing a machine for making a plurality of bags, an enclosed pathway and a hopper for conveying, storing, and dispensing the bags.

FIGS. 1–4 illustrate an embodiment of the present invention that generally comprises an air bag forming device 10, an enclosed pathway 30, an air pressurization device 12 for conveying the linked air bags through the pathway, and a hopper 40 having a plurality of auxiliary drives 42. The hopper 40 stores, conveys, and dispenses the chain type packing material consisting of a series of linked air bags 20.

Referring to FIG. 1, the air bag forming device 10 may be any conventional device used to manufacture a plurality of bags 20 formed with included air. Examples of such machines are given in U.S. Pat. No. 3,575,757 to Smith, U.S. Pat. No. 3,667,593 to Pendleton and U.S. Pat. No. 5,693,163 to Hoover et al., each of which is incorporated into this application by reference. In general, the bags 20 are formed by sealing two plastic films 16 together to form a series of inflated and interconnected bags. The bags may be easily separated from each other along the link interconnecting adjacent bags as needed for packaging. The bags are usually square or rectangular in shape, and typically range in size from 4 inches to 12 inches on each side. One preferable air bag is sized to be about 8 inches on each side.

Figure 2:
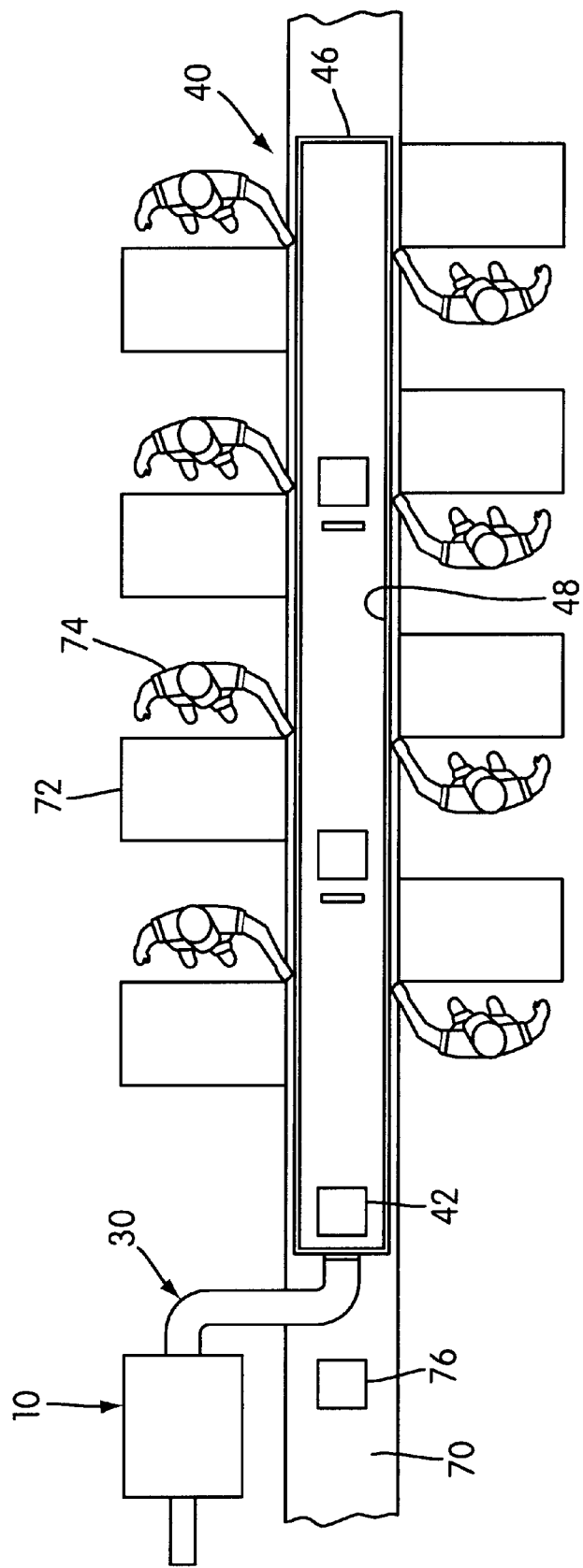
FIG. 2 is a top plan view of the present invention and a plurality of workers at packing stations.
Figure 3:
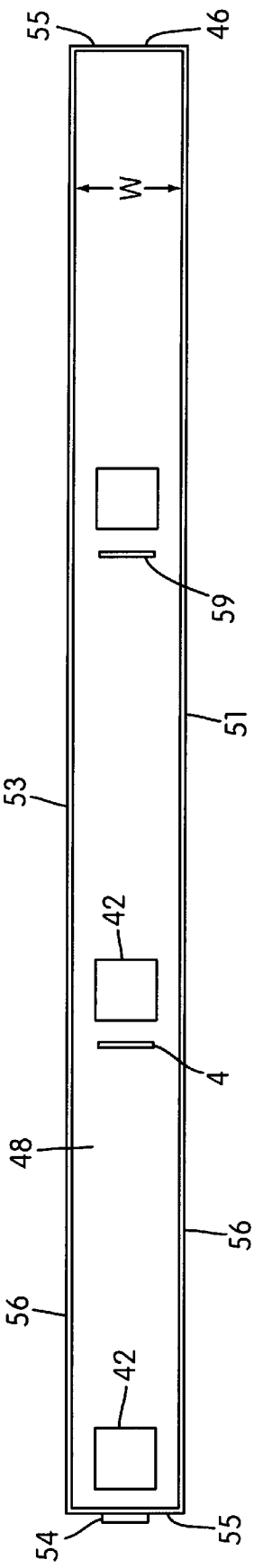
FIG. 3 is a top plan view of the hopper of the present invention.

The enclosed pathway 30 transfers the bags 20 from the forming machine 10 to the elongated hopper 40. The enclosed pathway 30 includes an inlet 32 to receive the chain of bags 20 from the air bag forming device 10. The inlet 32 is preferably located near the air pressurization device 12 to maximize the conveying force through the pathway. An outlet 34 is located at the remote end of the pathway 30 and is connected to the air bag inlet 54 of the elongated hopper 40. The pathway 30 is preferably formed with upper and lower horizontal sections 36, 37 and a medial vertical section 38. To assist in the smooth flow of air, the interface between the horizontal sections 36, 37 and vertical section 38 includes curvilinear corners 35a, 35b. The corners are curved in order to reduce the frictional forces caused by the airflow transitioning between the horizontal and vertical sections 36–38. Accordingly, the bags 20 entrained within the airflow will travel readily upward into and through the vertical section 38, and ultimately into the hopper. As seen in FIG. 2, the pathway can be inclined to avoid interfering with the conveyor 70. Of course, other configurations could be used as needed.

The enclosed pathway 30 is preferably formed of 26 gauge galvanized steel, though other materials, such as other metals or plastics, can also be used. In any event, the pathway preferably has an interior surface which is substantially smooth and free of protrusions to avoid impeding the travel of the linked air bags 20 to the hopper. The thickness of the material should be sufficient to withstand the pressure generated by the air pressurization device 12. The pathway 30 is preferably circular with a diameter of 9.5 to 13 inches, and most preferably ten inches in diameter. Nevertheless, the pathway may have other sizes and cross sectional shapes such as rectangular, oval, or square. The overall length of the enclosed pathway 30 is preferably about fifteen feet but may vary depending on the needs of the operation and the force of the air pressurization device 12.

The air pressurization device 12 is preferably a conventional fan and motor to produce a volume and velocity of air sufficient to convey the chain of linked air bags 20 from the air bag forming device 10, through the enclosed pathway 30, and into hopper 40. The air pressurization device 12 includes an outlet 14 which is fastened to a front end 39 of the enclosed pathway 30 to provide the required airflow. The device 12 preferably includes a power rating of one-third to one-half horsepower and a rated volume flow speed of 150–210 cubic feet per minute ("cfm"). In the most preferred construction, the device has a one-third horsepower and provides a volume flow speed of 175 cfm. Depending on the overall length, diameter, and arrangement of the enclosed pathway 30, other powers and volume flows may be employed.

The hopper 40 conveys, stores, and dispenses the air bags 20 to the workers 74. The hopper 40 includes a front end panel 44 coupled to pathway 30, a closed remote end panel 46, and a plurality of longitudinal panels extending between the ends including a bottom panel 50, side panels 51, 53, and a top panel 48. The front end panel 44 includes air bag inlet 54 that is sized and adapted to receive the flow of the chain of linked air bags 20 from the enclosed pathway 30. The air bag inlet 54 preferably has a collar that includes a ribbon of material projecting substantially perpendicularly away from the front end panel 44 so as to mate with the enclosed pathway 30. Accordingly, in the preferred construction, the air bag inlet 54 has a diameter of about ten inches so as to match the outlet 34 of the pathway 30. When the end panel 44 consists of a flexible material, the inlet is formed of a rigid ring secured into the end panel. Alternatively, the air bag inlet 54 may be mounted in one of the longitudinal panels of the hopper at the front end of the hopper.

In the preferred construction, the hopper 40 preferably has a height (h) of 1.5 feet to 2.0 feet, a width (w) of 1.5 feet to 2.0 feet, and a length of 8.0 feet to 30 feet. The length of the hopper 40 is not so limited due to the advantageous use of a blower device, e.g., multiple jets 41 of air coming from the auxiliary drives 42 on the top surface 48, as discussed below. The hopper 40 is preferably suspended overhead by a plurality of vertical supports 4, such as suspension cables, at a height of approximately 5.5 feet to 6.0 feet above a ground surface 6 to enable easy access by most adults. The vertical supports 4 are attached to a building structure 2, such as a roof frame or beams. Nevertheless, other arrangements and supports can be used.

The hopper 40 further includes the plurality of auxiliary drives 42 to produce jets of air of sufficient volume and velocity to convey the bags 20 from the front end panel 44 to the remote end panel 46 of the hopper 40. The use of auxiliary drives 42 in the hopper 40 enables the hopper to have a varied length which can ultimately be very long and accommodate many work stations.

The auxiliary drives 42 are preferably located at substantially regular intervals along the top panel 48. The spacing between the auxiliary drives 42 is preferably between eight to ten feet, and is most preferably about nine feet. Of course, other spacings are possible depending on the size of the hopper and auxiliary drives. The spaced auxiliary drives 42 allow the designer to provide a distribution system with a variety of lengths and configurations.

Figure 4:
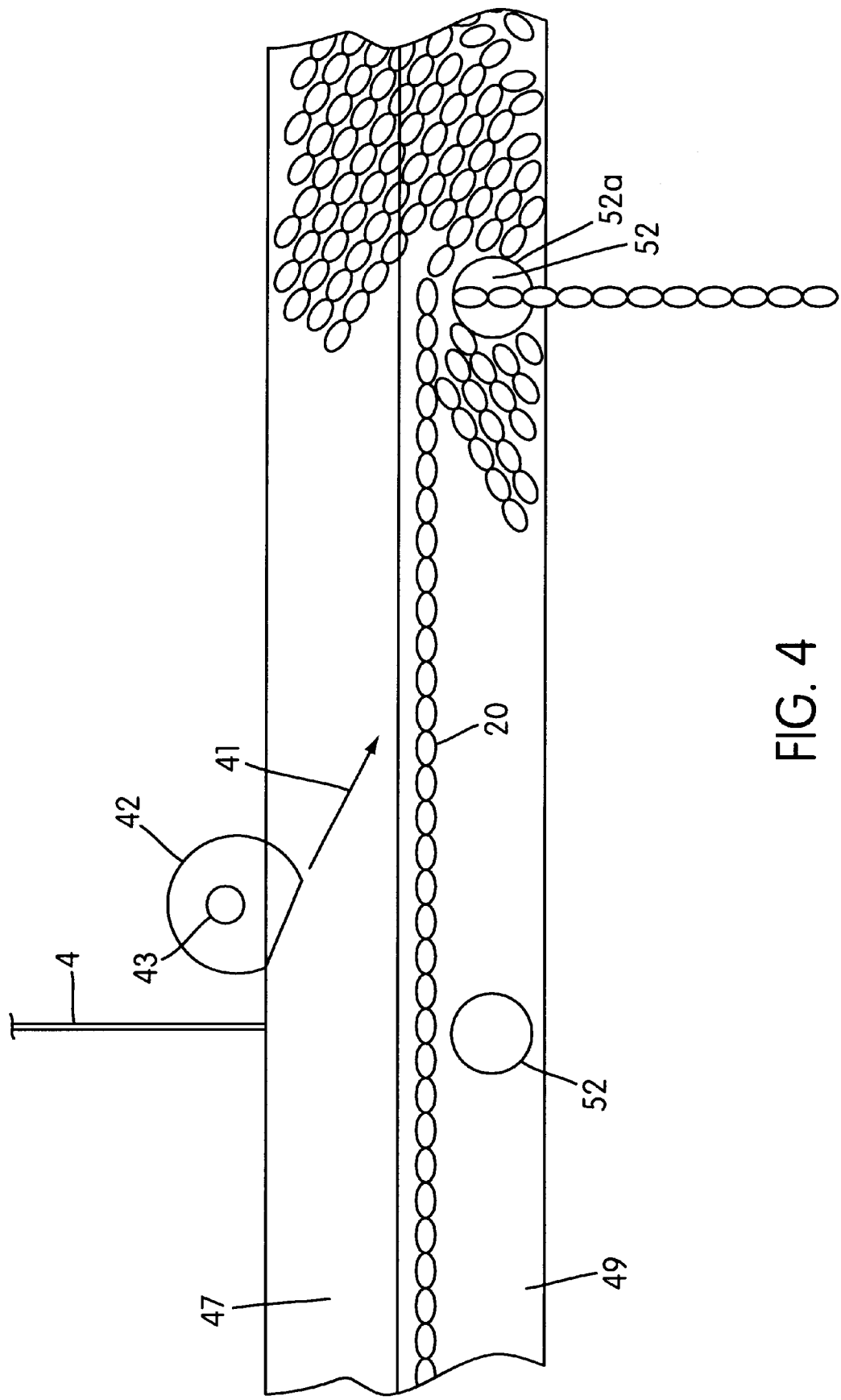
FIG. 4 is a partial side view of an auxiliary drive of the hopper of FIG. 1.

Referring to FIG. 4, the jet 41 of air is directed at a downward angle measured relative to the top panel 48. Due to this angle, the jet 41 of air is directed at the remote end panel 46 and the bottom panel 50. The angular dimension or angle of attack of the jet 41 of air is preferably about 40 to 50 degrees, and most preferably about 45 degrees. The angle of attack, however, may have a greater variation to suit a particular hopper, air bag size or set of auxiliary drives 42. The auxiliary drives may also be adjustable to vary the angle of attack as needed to maximize the flow of the linked bags to the remote end of the hopper. The auxiliary drives 42 preferably consists of booster fans for moving the air in the hopper. The jet 41 of air, however, may be created by other means, such as a large fan with interconnecting duct work having discharges or nozzles where the auxiliary drives 42 are located (not shown). The auxiliary drives 42 each preferably have a power rating ranging from one-third to one-half horsepower and have a volume flow ranging between 1150 to 1300 cfm, and most preferably has one-half horsepower and a rated volume flow speed of 1210 cfm. To assist in the conveyance of the air bags 20 through the hopper, the jets 41 of air preferably extend substantially the width of the hopper 40. The width of the jet 41 of air will then generally provide uniform coverage to push the bags 20 on the side panels 51, 53 towards the remote end of the hopper. The discharge openings in the nozzles of the auxiliary drives are preferably shaped as rectangles of approximately six inches by seven inches. Other discharge openings or nozzle shapes may also be used.

As the jets 41 of air contact the bags 20, a simultaneous longitudinal force and downward vertical force on the linked air bags 20 causes a bidirectional conveyance effect. As such, the angle of attack of the jet 41 of air on the bags 20 creates a force having a longitudinal component and a downward vertical component on the bags 20. The longitudinal force tends to convey the bags 20 downstream toward remote end panel 46. The downward vertical force tends to retain and push the bags 20 towards the bottom panel 50. In this way, the hopper 40 fills up with bags 20 such that the bags 20 on the lower portion of the hopper 40 can be easily reached by the workers 74 through ports 52.

The bags 20 are conveyed through the hopper 40 by a series of handoff transfer actions. As the bags 20 enter the hopper 40, each jet 41 of air transfers the bags 20 in the longitudinal direction and hands off or passes the bags 20 to the immediate downstream jet 41 of air until bags 20 reach the remote end panel 46 or the bags 20 already accumulated at the remote end. For example, a first jet of air will transfer the bags 20 to a second jet of air; the second jet of air will transfer the bags 20 to a third jet of air and so forth. The plurality of the jets 41 of air are advantageously located to retain the bags 20 in substantial motion until the bags 20 fill the volume of the hopper 40. The jets 41 of air are strategically placed in the hopper 40 to replenish or boost the forward momentum of the bags 20 as they travel through the hopper. It should be recognized that one skilled in the art may place any number of the jets 41 of air in spaced increments to convey a plurality of bags 20 using the present invention.

During the operation, the bags 20 accumulate from the remote end panel 46 toward the front end panel 44. A switch 62 is provided in the hopper 40 to stop the forming and filling actions of the forming machine 10 and air pressurization device 12 when the hopper 40 reaches a predetermined filled volume. The switch 62 may be a contact type, spring biased type or other known switch or sensor. This use of a switch or the like is needed because the rate of removal of the bags 20 is generally less than the rate of supply of the bags 20. To permit filling of the hopper 40, the switch 62 is provided in close proximity to the front end of the hopper 40. The auxiliary drives 42 continue to run, even when the air bag forming device 10 and the air pressurization device 12 are suspended by switch 62, in order to keep moving the bags 20 toward the remote end as the bags are removed from the hopper. The air bag forming device 10 and device 12 are preferably restarted by a manual switch (not shown) initiated by one of the workers 74.

The side panels 51, 53 include a plurality of dispensing ports 52. The dispensing ports 52 are sufficiently sized so as to provide manual access to the bags 20 located in the hopper 40. The hopper 40 can be operated with only a few or many dispensing ports 52. The number of ports 52 on each side may vary as required by the needs of the intended packaging operation. The dispensing ports 52 are preferably located close to the bottom panel 50, for example, at a distance of 2 to 3 inches from the bottom panel of the hopper. The dispensing ports 52 may also have any variety of shapes and sizes, such as circular, square, or rectangular. In a circular shape, the diameter of the ports 52 preferably ranges between seven to ten inches. The ports 52 are preferably bounded by a rigid ring 52a to prevent damage to the side panels 51, 53. The ports may be open or include a flexible material within the ring which is the same or different from the side panels and which is cut with an "X" shape to allow the hands of the workers 74 to enter, access, and remove the bags 20 while still retaining at least a partial closure of the port. In either case, the accumulated air bags 20 tend to block the ports and prevent the loss of excessive air from the hopper as the hopper fills.

The panels of the hopper 40 are preferably supported by a frame formed by a plurality interconnecting frame members 56. In the preferred construction, these frame members form the shape of an elongated rectangular box. Longitudinal frame members 56 extend between the front and remote end panels 44, 46 and along the periphery of panels 48, 50, 51, 53. The front and rear end panels 44, 46 are each formed with a square shape in which frame members 55 extend the width (w) of the hopper 40 and frame members 57 extend the height (h) of the hopper 40. Top panel 48 includes a one or more support members 59 mounted in the width direction (w) or transversely between the longitudinal members 56 at spaced intervals between the two end panels 44, 46 to assist in preventing the hopper 40 from excessive twisting or bending due to its length. Similar supports may also be provided along the bottom and side panels 50, 51, 53. The frame members preferably embody rods or tubular pipes. When using a tubular pipe, a metallic pipe of ¾ inch to 1 inch diameter is preferred. If desired, rigid polyvinyl chloride pipe or pipes of other materials may also be used.

In the preferred construction, the top panel 48, and the top one-half portion of side panels 51, 53 are formed of a material with microscopic pores which permit a controlled air relief for exhausting or venting the excess air that has been introduced into the hopper 40 by the air pressurizing device 12 and auxiliary drives 42. One example of an air relief material which could be used is mesh material known as SHELTHER-RITE® vinyl coated fabric manufactured by the Seaman Corporation, a subsidary of Dupont Corporation. Although other materials, even non-venting materials, could be used so long as suitable vents or relief valves are included in the hopper.

The bottom panel 50 and the lower half of the side panels 51, 53 are preferably formed of transparent materials (or at least translucent), such as a clear vinyl plastic sheet, as display surfaces 49 to provide a visual display of the bags 20 in the hopper 40. Nevertheless, the transparent display surfaces 49 could be formed as segments which extend along only one or more portions of the length of the hopper. The venting and display materials as well as the end panels are fastened together by a conventional method, such as stitching or the like. The front end panel 44, remote end panel 46 and panels 48, 51, 53 are attached to frame members by sleeves.

FIG. 2 illustrates one possible use of the present invention in a packing operation, but the invention is not so limited. In this arrangement, a plurality of packing stations 72 is located next to a conveyor belt system 70. The conveyor belt system 70 conveys shipping containers 76 with the finished goods toward the workers 74. The workers 74 reach up and access the bags 20 in the hopper 40 via the dispensing ports 52. The bags 20 are separated from the chains as needed and placed into the shipping containers 76. The unused bags will often hang down in a chain from the accessed port 52 for easy continued access for the user.

A further advantage of the present invention is that the hopper 40 may be used as a supplemental cooling system for the workers 74. Instead of the auxiliary drives 42 drawing air from the ambient surroundings, conditioned cooling air may be employed as a supply air. The jets 41 of air will then be exhausted through the air relief surfaces 47 and the dispensing ports 52 when accessed. The cooled exhausted air will by convection tend to drop down in the worker area.

The present invention has been described in terms of preferred and exemplary embodiments. Numerous other embodiments, modifications and variations within the scope and spirit of the appended claims will occur to persons of ordinary skill in the art from a review of this disclosure.

What is claimed is:

1. A method of conveying and dispensing linked air bags comprising:
   conveying a plurality of linked air bags through a pathway by air pressure from a source of linked air bags to a hopper;
   conveying the linked air bags within the hopper by way of air from a receiving end of the hopper to a remote end of the hopper; and
   dispensing the linked air bags from the hopper to a plurality of work stations.

2. The method of claim 1, wherein the source of linked air bags is a forming machine.

3. The method of claim 1, further comprising the step of displaying the linked air bags in the hopper as the linked air bags are being conveyed.

4. The method of claim 1, wherein the air bags are dispensed from the hopper manually through at least one port in a side of the hopper.

5. The method of claim 1, wherein the air bags are conveyed inside of the hopper by a plurality of angularly directed air jets spaced from the receiving end of the hopper to the remote end of the hopper.

6. The method of claim 5, wherein the air jets are directed from an upper portion of the hopper.

7. The method of claim 5, further comprising accumulating the air bags within the hopper and sensing a fill volume of the hopper.

8. The method of claim 7, further comprising suspending operating of the source responsive to sensing the fill volume of the hopper.

9. A method of conveying and dispensing linked air bags comprising:

conveying a plurality of linked air bags through a pathway by air pressure from a source of linked air bags to a hopper; and dispensing the linked air bags from the hopper to a plurality of work stations, wherein the air bags are conveyed through the hopper to a remote end of the hopper by a plurality of horizontally spaced apart jets of air.

10. The method of claim 9, wherein the hopper has a longitudinal axis and each jet of air is directed at an angle to the longitudinal axis of the hopper.

11. The method of claim 9, wherein the air bags are dispensed from the hopper by manually pulling the linked air bags through one or more ports in sides of the hopper.

12. The method of claim 11, wherein the source of linked air bags is a forming machine.

13. The method of claim 12, further comprising the step of suspending the operation of the forming machine when the hopper has reached a predetermined volume.

14. The method of claim 12, wherein the ports for manually dispensing the linked air bags are at least five feet above the ground.

15. The method of claim 14, wherein the linked air bags are conveyed upwardly through the pathway from the forming machine to the receiving end of the hopper.

16. A method of conveying and dispensing linked air bags comprising:

conveying a plurality of linked air bags through a pathway by air pressure from a source of linked air bags to a hopper; and dispensing the linked air bags from the hopper to a plurality of work stations; wherein the air bags are conveyed from a receiving end of the hopper to the remote end of the hopper by one or more jets of air contacting the linked air bags.

17. The method of claim 16, further including sensing the when the hopper fills to a predetermined volume.

18. The method of claim 17, further including suspending operation of the source upon sensing the predetermined volume.

19. The method of claim 16, in which the hopper includes a longitudinal axis extending from the receiving end to the remote end, and each jet of air contacts the linked air bags at an inclination angle to the longitudinal axis of the hopper.

20. The method of claim 19, wherein the inclination angle ranges between 40 to 50 degrees.

21. The method of claim 19, in which the step of dispensing further comprises manually removing at least one of the linked air bags from the hopper.

22. The method of claim 19, wherein the hopper includes a plurality of ports at spaced intervals on at least a side of the hopper extending from the receiving end to the remote end.

* * * * *